Aug. 24, 1943.   H. F. BENNETT   2,327,759
TELEPHOTO OBJECTIVE
Filed July 26, 1941   2 Sheets-Sheet 1

Fig.1

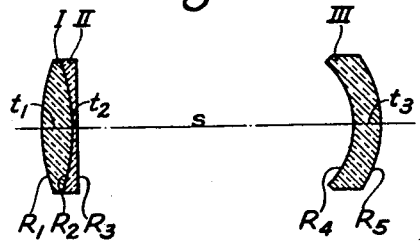

| EXAMPLE 1 | | f/3.7 | | f = 100 mm. |
|---|---|---|---|---|
| COVERING POWER 7° | | | SINE CONDITION −0.12 | |
| LENS | $N_D$ | V | RADII | THICKNESSES |
| I | 1.516 | 64.0 | $R_1 = +36.0$ mm | $t_1 = 6.0$ mm. |
| II | 1.617 | 36.6 | $R_2 = -38.3$ mm | $t_2 = 1.2$ mm. |
| | | | $R_3 = -716.0$ mm | $s = 54.1$ mm. |
| III | 1.516 | 64.0 | $R_4 = -16.5$ mm | $t_3 = 5.4$ mm. |
| | | | $R_5 = -23.3$ mm | B.F. = 23.1 mm. |

Fig.2

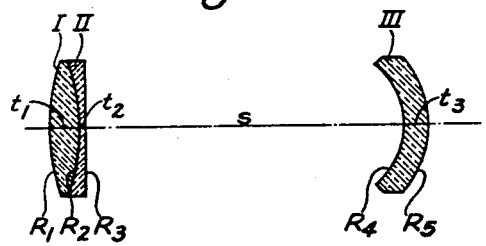

| EXAMPLE 2 | | f/3.7 | | f = 100 mm. |
|---|---|---|---|---|
| COVERING POWER 6° | | | SINE CONDITION +0.03 | |
| LENS | $N_D$ | V | RADII | THICKNESSES |
| I | 1.516 | 64.0 | $R_1 = +41.5$ mm | $t_1 = 5.5$ mm. |
| II | 1.617 | 36.6 | $R_2 = -39.0$ mm | $t_2 = 1.2$ mm. |
| | | | $R_3 = -301.0$ mm | $s = 62.7$ mm. |
| III | 1.516 | 64.0 | $R_4 = -15.7$ mm | $t_3 = 4.5$ mm. |
| | | | $R_5 = -20.4$ mm | B.F. = 18.4 mm. |

Harold F. Bennett
INVENTOR

BY  *Newton M Perrins*
ATTORNEY

Aug. 24, 1943.   H. F. BENNETT   2,327,759
TELEPHOTO OBJECTIVE
Filed July 26, 1941   2 Sheets-Sheet 2

Fig.3

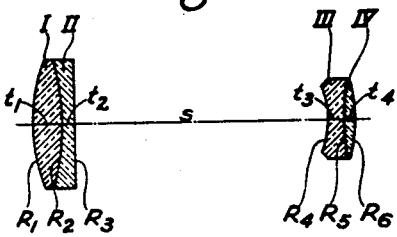

| EXAMPLE 3 | | f/3.7 | | f=100 mm. |
|---|---|---|---|---|
| COVERING POWER 8° | | | SINE CONDITION +0.14 | |
| LENS | $N_D$ | V | RADII | THICKNESSES |
| I | 1.541 | 59.9 | $R_1$ = +34.7 mm. | $t_1$ = 5.8 mm. |
| II | 1.673 | 32.2 | $R_2$ = −45.4 mm. | $t_2$ = 2.3 mm. |
| | | | $R_3$ = ∞ | s = 49.7 mm. |
| III | 1.498 | 67.0 | $R_4$ = −16.6 mm. | $t_3$ = 3.0 mm. |
| IV | 1.572 | 57.4 | $R_5$ = +47.8 mm. | $t_4$ = 2.3 mm. |
| | | | $R_6$ = −29.5 mm. | B.F. = 26.7 mm. |

Fig.4

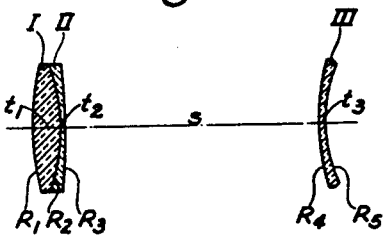

| EXAMPLE 4 | | f/3.7 | | f=100 mm. |
|---|---|---|---|---|
| LENS | $N_D$ | V | RADII | THICKNESSES |
| I | 1.516 | 64.0 | $R_1$ = +50.0 mm. | $t_1$ = 5.4 mm. |
| II | 1.617 | 36.6 | $R_2$ = −37.6 mm. | $t_2$ = 1.2 mm. |
| | | | $R_3$ = −141.0 mm. | s = 50.0 mm. |
| III | 1.516 | 64.0 | $R_4$ = +44.7 mm. | $t_3$ = 1.6 mm. |
| | | | $R_5$ = +29.2 mm. | B.F. = 34.3 mm. |

Harold F. Bennett
INVENTOR

BY Newton M. Perrins

ATTORNEY

Patented Aug. 24, 1943

2,327,759

UNITED STATES PATENT OFFICE 2,327,759

TELEPHOTO OBJECTIVE

Harold F. Bennett, Rochester, N. Y., assignor to Eastman Kodak Company, Rochester, N. Y., a corporation of New Jersey Application July 26, 1941, Serial No. 404,216

15 Claims. (Cl. 88—57)

This invention relates to photographic objectives and particularly to telephoto objectives.

It is an object of the invention to provide an inexpensive telephoto objective with large aperture.

It is also an object of the invention to provide a lens of simple construction with reduced distortion and with corrected chromatic aberration both longitudinal and lateral.

It is a particular object of the invention to provide an inexpensive projection lens of long focal length and of a more convenient size to handle than heretofore available.

In the early development of telephoto objectives it was common to employ a simple negative lens spaced behind a simple or compound positive lens or merely to increase very slightly the spacing of the lenses of a Galilean telescope. Such lenses were poorly corrected for spherical aberration and were restricted to small apertures such as F/12.5.

In the later development designers have gone to more complex and more expensive structures to obtain larger usable apertures and wider fields.

According to the present invention a telephoto objective is made up consisting of a positive doublet in the front and a meniscus negative component in the rear spaced more than 0.45 F and less than 0.9 F from the front component, where F is the focal length of the objective. With this arrangement, I am able to correct a telephoto lens for spherical aberration, coma, chromatic aberration, both longitudinal and lateral, astigmatism, and curvature of field over a large aperture such as F/3.7 and with a covering power of about 7° from the axis.

I have found that a great space between the front and rear components is an advantage in reducing the zonal spherical aberration. This makes a sharper image with the same aperture or alternatively makes possible the use of a larger aperture with the same sharpness of image. For example, all the objectives shown in the accompanying drawings have less zonal spherical aberration than the objectives shown in my U. S. Patent 2,231,699. This is due to the greater separation of the components.

I have found that for the best working out of my invention the shape of the negative meniscus rear component should be such that the radius of curvature of the convex surface is greater than one-eighth of the focal length and less than said focal length. This form is of advantage in obtaining a flat image field.

In a preferred form of the invention the negative rear component is concave to the front and its thickness is greater than 0.02 F and less than 0.20 F. I have found that these features of the structure aid in eliminating the lateral chromatic aberration and in reducing the distortion which is common in telephoto lenses as a class. If complete elimination of distortion is required for some special purpose, the present invention with the features described may be combined with the rear component disclosed in my Patent 2,231,699 which issued February 11, 1941.

I have found that the effect on the distortion of an additional thickness of glass interposed between the concave front surface and the convex rear surface of the negative rear component is similar to the effect of a plane parallel plate interposed between the last surface and the image plane. The latter effect is well known and is described in textbooks, e. g., "Das Photographische Objectiv" by Merte, Richter, and von Rohr, Vienna, 1932. This book is vol. 1 of the "Handbook der Wissenschaftlichen und Angewandten Photographie" edited by Hay and von Rohr. On the other hand, the desired effect is even more pronounced when the additional glass is in the rear component rather than in a separate plate.

I have found that when such an additional thickness of glass is used to reduce the distortion it also reduces the lateral chromatic aberration. This is due to the condition that the index of refraction of the glass is greater and the corrective effect is accordingly greater for the shorter wavelengths.

Telephoto lenses with flatness of field can also be made according to a different embodiment of the invention in which the negative rear component is a meniscus concave toward the rear. This type of lens is of especial value in correcting the zonal spherical aberration, but it suffers from somewhat more distortion than the preferred form with rear component concave to the front. It is adapted for uses in which distortion is not a disadvantage and uses in which it is not required to cover as wide an angle of field.

I have found that increasing the thickness of the rear component does not aid in reducing the distortion if the rear component is concave toward the rear. In this case the principal rays are collected by the convex surface and rendered less divergent, and consequently the effect analogous to that of a parallel plate is not marked.

In telephoto lenses with long central space I have found that there is a tendency toward a higher order coma effect or upper rim ray disagreement due to the upper rim rays suffering disproportionate distortion as they pass through the rear component near the edge. I have also found that this tendency can be counteracted by correcting the sine condition to a negative value instead of to the zero or positive value usually aimed at in the design of all objectives. Since the term "sine condition" has several slightly different (although similar) definitions, the one specifically here employed is given $$\text{Sine condition} = \frac{h}{\sin u'} - f - S.\ A.$$

where $h$ is the height of a marginal ray parallel to the axis at the front surface of the lens, $f$ is the focal length and S. A. is the spherical aberration measured from the focal plane in a direction away from the lens, and $u'$ the angle at which the ray strikes the axis at the focus plane.

The method by which I alter the sine condition while maintaining substantially the same residuals of the other monochromatic aberrations in a telephoto objective of this type is as follows:

I choose as independent variables the curvatures of the front surface and the cemented surface respectively of the front component, and I maintain substantially constant the focal length of the front component by a corresponding change in the curvature of the surface facing the rear component. These changes have a considerable effect upon the sine condition, the spherical aberration or both, while at the same time they have a smaller effect upon the curvature of field and substantially no effect upon the distortion. I alter the sine condition and approximately restore the spherical aberration to its previous value by varying the two independent variables. This action usually changes the curvature of field somewhat but this is restored by changing the shape of the rear component. Making the rear component more strongly meniscus causes the curvature of field to change in the direction of more backward curving, that is curving less toward the lens and/or more away from the lens. Changing the shape of the rear component also has an effect on the sine condition and spherical aberration which is of the same order of magnitude as its effect on the curvature of field. However, as only a small change in the curvature of field is sufficient to restore it to its original value, accordingly a small change in the front component is sufficient to restore the spherical aberration to its original value after changing the shape of the rear component.

Repeating this designing process one or more times results in a lens whose aberration residuals (except sine condition) agree with the original values to any predetermined degree of exactness, and whose sine condition differs from the original value substantially in proportion to the change in curvature of the front surface. Thus according to a preferred embodiment of the invention the front surface of the front component is made relatively strong to give negative sine condition to the objective.

The manner in which the two independent variables affect the since condition and the spherical aberration is described more explicitly as follows:

Increasing the curvature of the first surface while substantially maintaining the focal length of the front component by changing the curvature of the third surface changes the sine condition in the direction of greater negative values while at the same time it changes the spherical aberration either in the direction of greater negative values, in the direction of greater positive values, or only slightly in either direction according as the sine condition of the front component taken alone is somewhat negative, somewhat positive, or nearly zero. In regard to the second surface, increasing its curvature while substantially maintaining the focal length of the front component by changing the curvature of the third surface changes the spherical aberration in the direction of greater positive values while at the same time it changes the sine condition very slightly in the direction of greater negative values or leaves it substantially the same.

Therefore, in order to give negative sine condition to the objective the curvature of the front surface must be relatively strong, that is relative to the curvature that corresponds to a zero or positive sine condition of the objective, other things being substantially equal. By "other things" is meant the indices of refraction and the thicknesses of the several lens elements, the equivalent focal length of the front component, the separation of the front and rear components, and the spherical aberration, curvature of field, and equivalent focal length of the objective.

In a more preferred form of the invention the index of refraction at the concave glass-air surface of the rear component is low, preferably less than 1.55. This is the surface that contributes by far the most strongly to the flattening of the field. I have found that the field flattening effect of this surface depends upon its radius and the angles of incidence of the principal ray at this surface almost independently of the index of refraction. This holds true after taking into account the corresponding change in the curvature of the convex surface of the rear component substantially to restore the focal length of the objective. At the same time, if a glass of low index is used the ray suffers less upward deviation and correspondingly less distortion.

In the most preferred embodiment of the invention the negative rear component consists of a single meniscus element preferably concave toward the front and also preferably with the other features already mentioned. I have found that even with this simple inexpensive structure the chromatic aberration, both longitudinal and lateral, can be satisfactorily corrected, although of course not to the degree of perfection possible in more complex structures.

In the preferred form of this embodiment of the invention, that is when the rear component is concave toward the front, it is found that having the thickness of the rear component comparatively great as mentioned above also aids in this correction of the lateral chromatic aberration. Thicknesses between 0.02 F and 0.20 F have been found of greatest value.

These features alone produce the correction of the distortion and the lateral chromatic aberration in a novel manner, preferably in combination with the low refractive index already described.

In the accompanying drawings Figs. 1, 2, 3, and 4 illustrate respectively Examples 1, 2, 3, and 4, below. More particularly:

Fig. 1 shows an f/3.7 telephoto objective according to the most preferred embodiment of the invention.

Fig. 2 shows a similar embodiment with a longer central space.

Fig. 3 shows the invention combined with my U. S. Patent 2,231,699.

Fig. 4 shows an f/3.7 telephoto objective according to an embodiment of the invention in which the negative meniscus component is concave toward the rear.

In order to conform to the usual custom, the four lenses shown have been scaled down to a focal length of 100 mm. The data for this focal length are given below. The lenses were designed with visual achromatism and primarily to be manufactured with an actual focal length between 200 and 300 mm. They are particularly useful as projection lenses. They are three to five inches shorter and correspondingly more convenient to use than projection lenses of comparable focal lengths of the type heretofore in common use. Shorter, that is, as measured from the focal plane to the front of the lens.

Example 1 f/3.7      f=100 mm.

Covering power 7°      Sine condition −0.12

| Lens | $N_D$ | V | Radii | Thickness |
|---|---|---|---|---|
| I | 1.516 | 64.0 | $R_1=+36.0$ mm. | $t_1=6.0$ mm. |
| II | 1.617 | 36.6 | $R_2=-38.3$ | $t_2=1.2$ |
|  |  |  | $R_3=-710.0$ | $S=54.1$ |
| III | 1.516 | 64.0 | $R_4=-16.5$ | $t_3=5.4$ |
|  |  |  | $R_5=-23.3$ | $BF=23.1$ |

Example 2 f/3.7      f=100 mm.

Covering power 6°      Sine condition +0.03

| Lens | $N_D$ | V | Radii | Thickness |
|---|---|---|---|---|
| I | 1.516 | 64.0 | $R_1=+41.5$ mm. | $t_1=5.5$ mm. |
| II | 1.617 | 36.6 | $R_2=-39.0$ | $t_2=1.2$ |
|  |  |  | $R_3=-301.0$ | $S=62.7$ |
| III | 1.516 | 64.0 | $R_4=-15.7$ | $t_3=4.5$ |
|  |  |  | $R_5=-20.4$ | $BF=18.4$ |

Example 3 f/3.7      f=100 mm.

Covering power 8°      Sine condition +0.14

| Lens | $N_D$ | V | Radii | Thickness |
|---|---|---|---|---|
| I | 1.541 | 59.9 | $R_1=+34.7$ | $t_1=5.8$ |
| II | 1.673 | 32.2 | $R_2=-45.4$ | $t_2=2.3$ |
|  |  |  | $R_3=\infty$ | $S=49.7$ |
| III | 1.498 | 67.0 | $R_4=-16.6$ | $t_3=3.0$ |
| IV | 1.572 | 57.4 | $R_5=+47.8$ | $t_4=2.3$ |
|  |  |  | $R_6=-29.5$ | $BF=26.7$ |

Example 4 f/3.7      f=100 mm.

| Lens | $N_D$ | V | Radii | Thickness |
|---|---|---|---|---|
| I | 1.516 | 64.0 | $R_1=+50.0$ mm. | $t_1=5.4$ mm. |
| II | 1.617 | 36.6 | $R_2=-37.6$ | $t_2=1.2$ |
|  |  |  | $R_3=-141.0$ | $S=50.0$ |
| III | 1.516 | 64.0 | $R_4=+44.7$ | $t_3=1.6$ |
|  |  |  | $R_5=+29.2$ | $BF=34.3$ |

In all of these examples, the space between the front and rear components is between 0.45 and 0.9 times the focal length, the radius of curvature of the convex surface of the rear negative component is greater than one-eighth of the focal length and less than said focal length, and furthermore the concave surface of the negative meniscus component bounds a glass whose index of refraction is less than 1.55.

In Example 4 the negative component is concave toward the rear, while in the other examples it is concave toward the front. During the development of the invention preliminary work was done on both types, and both types were found to possess most of the advantages of the invention. The preferred type, with the negative component concave to the front, however, appeared to be better for the particular applications in mind at that time. Accordingly, the sine condition and covering power are given for the first three examples only.

The lens shown in Example 2 has the ordinary type of sine condition correction. This lens was found to have slight outward coma of the upper rim rays. In the preferred embodiment shown in Example 1 the sine condition was purposely made negative and this was found to counteract even this minor coma.

In Example 3 the invention is combined with some of the features of my U. S. Patent 2,231,699, notably in regard to the greater difference in index between the two elements of the front component and in regard to the cemented surface in the rear component which aids in further correcting distortion.

Having thus described four embodiments of my invention I wish to point out that it is not limited to these structures but is of the scope of the appended claims.

What I claim and desire to secure by Letters Patent of the United States is:

1. A telephoto objective comprising a front positive component consisting of a biconvex element cemented to the front of a negative element and a rear negative meniscus component axially spaced behind the doublet a distance between 0.45 and 0.9 times the focal length of the objective, with the radius of curvature of the convex face of the meniscus component greater than that of its concave face.

2. An objective according to claim 1 in which the radius of curvature of the convex face of the negative meniscus component is greater than one-eighth of the focal length of the objective and less than said focal length.

3. An objective according to claim 1 in which the negative meniscus component is concave toward the front.

4. An objective according to claim 1 in which the negative meniscus component is concave toward the front and the thickness of said negative component is between 0.02 and 0.20 times the focal length of the objective.

5. An objective according to claim 1 in which the front surface of the front component is relatively strong to give negative sine condition to the objective.

6. An objective according to claim 1 in which the concave surface of the negative meniscus component bounds a glass whose index of refraction is less than 1.55.

7. An objective according to claim 1 in which the negative component is compound with a positive element cemented to the rear of a negative element.

8. An objective according to claim 1 in which the negative component is concave to the front and is compound with a cemented surface convex to the front, the index of refraction of the glass immediately following the cemented surface exceeding that immediately preceding that surface by at least .07, the cemented surface having a radius of curvature between ¼ F and F.

9. A telephoto objective comprising a positive doublet consisting of a biconvex element cemented to the front of a negative element and a single negative mensicus lens element axially spaced behind the doublet a distance between 0.45 and 0.9 times the focal length of the objective, with the radius of curvature of the convex face of the meniscus element greater than that of its concave face.

10. An objective according to claim 9 in which the negative meniscus element is concave toward the front.

11. An objective according to claim 9 in which the negative meniscus element is concave toward the front and the thickness of said element is between 0.02 and 0.20 times the focal length of the objective.

12. A telephoto objective comprising a positive doublet consisting of a biconvex element cemented to the front of a negative element and, axially spaced at a distance between 0.45 F and 0.9 F behind the doublet where F is the focal length of the objective, a meniscus negative element concave to the front with an index of refraction less than 1.55, a thickness between 0.02 F and 0.20 F and a rear surface whose radius of curvature is between $\frac{1}{8}$ F and F.

13. An objective according to claim 12 in which the front surface of the doublet is relatively strong to give negative sine condition to the objective.

14. In a telephoto objective system having a collective front doublet and a rear dispersive component spaced behind the doublet, a single dispersive meniscus element constituting said rear component, having a convex rear surface with a radius of curvature between one eighth of the focal length and the focal length and having a thickness between 0.02 and 0.20 times the focal length of the objective.

15. An element which is the rear component of a telephoto objective according to claim 14 in which the index of refraction of the element is less than 1.55.

HAROLD F. BENNETT.